(12) United States Patent
Waki et al.

(10) Patent No.: US 7,858,676 B2
(45) Date of Patent: Dec. 28, 2010

(54) PIGMENT DISPERSION AND INK COMPOSITION FOR INK JET PRINTING

(75) Inventors: Minoru Waki, Himeji (JP); Naoki Okamoto, Himeji (JP); Izumi Yasuda, Himeji (JP)

(73) Assignees: Seiko Epson Corporation, Tokyo (JP); Mikuni Shikiso Kabushiki Kaisha, Himeji-shi (JP)

( * ) Notice: Subject to any disclaimer, the term of this patent is extended or adjusted under 35 U.S.C. 154(b) by 402 days.

(21) Appl. No.: 11/956,593

(22) Filed: Dec. 14, 2007

(65) Prior Publication Data

US 2008/0108746 A1 May 8, 2008

Related U.S. Application Data

(63) Continuation of application No. 10/486,930, filed as application No. PCT/JP03/06120 on May 16, 2003, now abandoned.

(30) Foreign Application Priority Data

May 16, 2002 (JP) .............................. 2002-141594

(51) Int. Cl.
| | |
|---|---|
| B41J 2/01 | (2006.01) |
| C08F 8/30 | (2006.01) |
| C08F 283/04 | (2006.01) |
| C08G 18/08 | (2006.01) |
| C08G 18/28 | (2006.01) |
| C08J 3/00 | (2006.01) |
| C08K 3/20 | (2006.01) |
| C08K 9/00 | (2006.01) |
| C08L 75/00 | (2006.01) |
| C09D 5/00 | (2006.01) |
| C09D 11/00 | (2006.01) |
| G01D 11/00 | (2006.01) |

(52) U.S. Cl. ............. 523/160; 523/161; 523/200; 523/205; 524/507; 524/589; 524/590; 524/591; 524/839; 524/840; 525/123; 525/455

(58) Field of Classification Search ................. 523/160, 523/161, 200, 205; 524/507, 589, 590, 591, 524/839, 840; 106/31.6; 347/1, 100; 525/123, 525/455

See application file for complete search history.

(56) References Cited

U.S. PATENT DOCUMENTS

| | | | |
|---|---|---|---|
| 5,160,372 | A | 11/1992 | Matrick |
| 5,955,515 | A | 9/1999 | Kimura et al. |
| 5,969,002 | A | 10/1999 | Kijlstra et al. |
| 6,114,411 | A | 9/2000 | Nakamura et al. |
| 6,620,229 | B2 | 9/2003 | Doi et al. |
| 6,794,425 | B1 | 9/2004 | Elllis et al. |
| 7,008,994 | B1 | 3/2006 | Waki |
| 2002/0019458 | A1 | 2/2002 | Hirasa et al. |
| 2003/0166742 | A1 | 9/2003 | Hirasa et al. |

FOREIGN PATENT DOCUMENTS

| | | |
|---|---|---|
| EP | 0 466 345 A1 | 1/1992 |
| EP | 616017 | 9/1994 |
| EP | 0 894 835 A2 | 2/1999 |
| EP | 1 086 975 A1 | 3/2001 |
| EP | 1167466 | 1/2002 |
| JP | 2-255875 | 10/1990 |
| JP | 3-240586 | 10/1991 |
| JP | 5-247370 | 9/1993 |
| JP | 8-209045 | 8/1996 |
| JP | 9-104834 | 4/1997 |
| JP | 11-80633 | 3/1999 |
| JP | 2000-1639 | 1/2000 |
| JP | 2000-144028 | 5/2000 |
| JP | 2000-239392 A | 9/2000 |
| JP | 2001-254036 | 9/2001 |
| JP | 2002-30237 | 1/2002 |
| JP | 2002-121447 | 4/2002 |
| JP | 2002-167536 | 6/2002 |
| JP | 2002-235023 | 8/2002 |
| JP | 2002-327137 | 11/2002 |
| JP | 2003-96342 | 4/2003 |
| JP | 2003-213164 | 7/2003 |
| WO | WO 00/17250 A | 3/2000 |
| WO | WO 00/52106 | 9/2000 |
| WO | WO 03/006561 A2 | 1/2003 |

OTHER PUBLICATIONS

Machine Translation of JP 2000-239392 A (2000).

*Primary Examiner*—Patrick D Niland
(74) *Attorney, Agent, or Firm*—Oblon, Spivak, McClelland, Maier & Neustadt, L.L.P.

(57) ABSTRACT

An aqueous pigment dispersion for ink jet having a pigment dispersed, characterized by containing a water-soluble resin and a resin having a urethane bond and/or an amide bond.

27 Claims, No Drawings

PIGMENT DISPERSION AND INK COMPOSITION FOR INK JET PRINTING

RELATED APPLICATION INFORMATION

This application is a Continuation of U.S. Ser. No. 10/486,930, filed Feb. 25, 2004, now abandoned, which is a national stage U.S. application of PCT/JP03/06120, filed May 16, 2003, and claims priority to Japanese application JP 2002-141594, filed May 16, 2002, the contents of each of which are hereby incorporated by reference.

TECHNICAL FIELD present invention relates to a pigment dispersion suitably usable for various ink compositions including use for ink jet printing, and an ink for ink jet printing.

BACKGROUND ART

A pigment type ink using a pigment as a coloring agent has an advantage of being excellent in light resistance and water resistance as compared with a dye type ink using a dye as a coloring agent. However, since a pigment is generally insoluble in water, it is necessary to be mixed with a resin called as a dispersant for being stably dispersed in water. Also, as compared with a dye type ink, a pigment type ink as a dispersion is poor in stability as a lapse of time since a pigment settles.

Also, it is pointed out that a pigment type ink generally has a disadvantage of being poor in transparency and coloring. Particularly, when recording on a transmission manuscript represented as an OHP film processed for an aqueous recording liquid, transparency is lowered and coloring is remarkably dull due to light scattering by pigment particles.

It is required for ink jet use to be printed at a high speed, but unlike a dye penetrated into the inside of a recording medium, a pigment stays on a surface of a recording medium and accordingly friction resistance of an image obtained becomes a problem.

In order to improve transparency and coloring, it is necessary to have pigment particles dispersed as finely as possible. Particularly, in case of ink jet use for injecting ink droplets from a minute nozzle, a strict dispersion stability and a highly finely dispersed state are required in order to achieve satisfactory performances such as color reproducibility on a recorded material and injecting property at the time of injecting from a nozzle at a high speed. For this purpose, various elaborations are made. For example, an elaboration of fully adsorbing a high molecular dispersant on a pigment or an elaboration of firmly fixing a high molecular dispersant on a finely dispersed pigment by means of coating a pigment with a resin is studied.

For instance, the following proposals have been made. A pigment and a resin are kneaded to prepare a solid colored compound, and the compound is dispersed in a dispersing medium to improve transparency and coloring (JP-A-11-80,633); a storage stability of a dispersion is improved by using a pigment coated with a cured polymer having a polar group insoluble in a dispersion medium (JP-A-5-247,370); a pigment is coated with a resin swellable in a dispersion medium to prevent clogging or bleeding (JP-A-3-240,586); and an aqueous solution containing a resin, an amine and water are stirred to fully dissolve the resin, and a premixed pigment is subjected to dispersion treatment to stabilize injecting by controlling a non-adsorbed resin amount to at most 2% (JP-A-2-255,875).

In the ink jet use, it is required for improving a printing speed to enhance permeability of an ink composition and to reduce a drying time. However, when simply adding a general penetrant, there is a case that the permeability can not be fully provided due to a relationship between a pigment and other components or a case that the penetrant damages color reproducibility, which adversely affects on an image quality. Therefore, various proposals have been made to solve these problems.

For example, by using an acetylene glycol type and/or polysiloxane type surfactant as a penetrant and using an alkyl ether derivative of a polyhydric alcohol such as ethylene glycol monobutyl ether as an organic solvent, a satisfactory color reproducibility is achieved (JP-A-2002-30,237); and by using an ink containing water, a pigment, a wetting agent and a specific polyoxyethylene alkyl ether acetate, an ink having excellent permeability, drying property and image quality and having no strike through is provided (JP-A-2001-254,036).

However, when preparing an ink having a high permeability and a quick drying property, it has been found by the present inventors that a stable dispersibility of a pigment is sometimes spoiled by an interaction among a dispersing resin, a penetrant and a solvent for preparing the ink.

The present inventors have intensive studied to solve these problems. As a result of the study, it has been found that an excellent ink for ink jet and an excellent pigment dispersion for ink jet having a satisfactory dispersion stability can be obtained without spoiling other performances by using a dispersion having a combination of specific plural resins contained, particularly in the preparation of an ink having a high permeability.

Further, it has been unexpectedly discovered that gloss of a recorded material is improved by the present invention as compared with a conventional pigment type ink. Particularly, it has been found that when using a glossy paper as a medium, the improvement of gloss is remarkable.

DISCLOSURE OF THE INVENTION

Thus, the essential features of the present invention reside in:

(1) A pigment dispersion for ink jet having a pigment dispersed, characterized by containing a water-soluble resin and a resin having a urethane bond and/or an amide bond;

(2) the pigment dispersion according to the above feature (1), which is obtained by blending the water-soluble resin with the pigment, finely pulverizing the pigment in a kneading step and a dispersing step, and further adding the resin having a urethane bond and/or an amide bond thereto to cause crosslinking;

(3) the pigment dispersion according to the above feature (1) or (2), wherein the resin has a crosslinking rate of from 20 to 100%;

(4) the pigment dispersion according to any one of the above features (1) to (3), which is a dispersion for ink jet;

(5) an ink composition for ink jet having a pigment dispersed, characterized by containing a water-soluble resin and a resin having a urethane bond and/or an amide bond;

(6) the ink composition for ink jet according to the above feature (5), which is obtained by blending the water-soluble resin with the pigment, finely pulverizing the pigment in a kneading step and a dispersing step, and further adding the resin having a urethane bond and/or an amide bond thereto to cause crosslinking;

(7) the ink composition for ink jet according to the above feature (5) or (6), wherein the resin has a crosslinking rate of from 20 to 100%;

(8) an ink composition for ink jet, which is obtained by adding an organic solvent to the pigment dispersion as defined in any one of the above features (1) to (3);

(9) an ink jet recording method, which comprises printing by discharging the ink composition for ink jet as defined in any one of the above features (5) to (8) from a nozzle of an ink jet printer; and

(10) an ink set having the ink composition for ink jet as defined in any one of the above features (5) to (8) charged into a cartridge.

Hereinafter, the present invention is described in details. The pigment dispersion of the present invention comprises at least a pigment and specific two kinds of resins.

(Pigment)

The pigment used in an aqueous ink composition for ink jet of the present invention is not specifically limited, and any of an organic pigment and an inorganic pigment can be used.

Examples of the organic pigment include an azo pigment such as an azolake, an insoluble monoazo pigment, an insoluble disazo pigment, a condensed azo pigment, a chelate azo pigment or the like; a polycyclic pigment such as a phthalocyanine pigment, a perylene pigment, a perynone pigment, an anthraquinone pigment, a quinacridone pigment, a dioxazine pigment, a thioindigo pigment, an isoindolinone pigment, a quinophthalone pigment or the like; a dye chelate such as a basic dye type chelate, an acidic dye type chelate or the like; a nitro pigment; a nitroso pigment; and the like.

Examples of the inorganic pigment include titanium oxide, iron oxide, rouge, chromium oxide, Prussian blue, ultramarine blue, molybdate orange, black iron oxide, chrome yellow, carbon black, and the like, and they can is be used respectively alone or in a mixture of two or more.

Among them, in view of light resistance, an isoindolinone type pigment, a quinacridone type pigment, a condensed azo type pigment, a phthalocyanine type pigment, a quinophthalone type pigment, an anthraquinone type pigment or carbon black is preferably usable.

Particular examples of the above organic pigments include pigment•yellow 1 (color index (hereinafter referred to as "C.I.") 11680), pigment•yellow 3 (C.I. 11710), pigment•yellow 14 (C.I. 21095), pigment•yellow 17 (C.I. 21105), pigment•yellow 42 (C.I. 77492), pigment•yellow 74 (C.I. 11741), pigment•yellow 83 (C.I. 21108), pigment•yellow 93 (C.I. 20710), pigment•yellow 98 (C.I. 11727), pigment•yellow 109 (C.I. 56284), pigment•yellow 110 (C.I. 56280), pigment•yellow 128 (C.I. 20037), pigment•yellow 138 (C.I. 56300), pigment•yellow 139 (C.I. 56298), pigment•yellow 147 (C.I. 60645), pigment•yellow 154 (C.I. 11781), pigment•yellow 155, pigment•yellow 180 (C.I. 21290), pigment•yellow 185, pigment•orange 5 (C.I. 12075), pigment•orange 13 (C.I. 21110), pigment•orange 16 (C.I. 21160), pigment•orange 34 (C.I. 21160), pigment•orange 43 (C.I. 71105), pigment•orange 61 (C.I. 11265), pigment•orange 71 (C.I. 561200), pigment•red 5 (C.I. 12490), pigment•red 8 (C.I. 12335), pigment•red 17 (C.I. 12390), pigment•red 22 (C.I. 12315), pigment•red 48:2 (C.I. 15865:2), pigment•red 112 (C.I. 12370), pigment•red 122 (C.I. 73915), pigment•red 177 (C.I. 65300), pigment•red 178 (C.I. 71155), pigment•red 202 (C.I. 73907), pigment•red 254 (C.I. 56110), pigment•violet 19 (C.I. 46500), pigment•violet 23 (C.I. 51319), pigment•blue 15:1 (C.I. 74160), pigment•blue 15:3 (C.I. 74160), pigment•blue 15:4 (C.I. 74160), pigment•blue 60 (C.I. 69800), pigment•green 7 (C.I. 74260), pigment•green 36 (C.I. 74265), and the like.

Particular examples of the above inorganic pigments include pigment•yellow 42 (C.I. 77492), pigment•white 6 (C.I. 77891), pigment•blue 27 (C.I. 77510), pigment•blue 29 (C.I. 77007), pigment•black 7 (C.I. 77266), and the like.

Preferable examples include pigment•yellow 74 (C.I. 11741), pigment•yellow 109 (C.I. 56284), pigment•yellow 110 (C.I. 56280), pigment•yellow 128 (C.I. 20037), pigment•yellow 155, pigment•yellow 180 (C.I. 21290), pigment•red 122 (C.I. 73915), pigment•red 202 (C.I. 73907), pigment•violet 19 (C.I. 46500), pigment•blue 15:1 (C.I. 74160), pigment•blue 15:3 (C.I. 74160), pigment•blue 15:4 (C.I. 74160), pigment•blue 60 (C.I. 69800), pigment•black 7 (C.I. 77266), and the like.

In the present invention, it is preferable to use an organic pigment in view of stability since its particle size easily becomes small and its specific gravity is also small. Further, when considering dispersibility, a primary particle size of a pigment is preferably at most about 0.1 μm.

(Water-soluble Resin)

The present invention is characterized by including at least two kinds of resins.

First resin is a water-soluble resin including various resins usable as a dispersant which is adsorbed on a pigment and works for improving dispersibility of the pigment.

Among them, a water-soluble resin having a hydrophobic group and a hydrophilic group is desirable since it is excellent in dispersing a pigment. Typical examples include a copolymer of a hydrophobic monomer and a hydrophilic monomer, and such a copolymer is particularly excellent in dispersing a pigment.

The term "hydrophobic monomer" means a monomer having a hydrophobic group and the term "hydrophilic monomer" means a monomer having a hydrophilic group, which are copolymerizable.

Examples of the hydrophobic monomer include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-methylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, vinyl toluene, and the like.

They may be used respectively alone or in a mixture of two or more.

A hydrophobic group contained in a hydrophobic monomer is not specially limited, examples of which include an organic group having an aromatic ring such as a phenyl group, a benzyl group or the like, which may be substituted, and an alkyl group which may be substituted, but a ring having an aromatic ring is particularly preferable.

Examples of a hydrophilic monomer include acrylic acid, methacrylic acid, maleic acid, itaconic acid and the like.

They may be used respectively alone or in a mixture of two or more. A ratio of a hydrophilic monomer and a hydrophobic monomer is not specially limited, but it is particularly preferable that a hydrophilic monomer: hydrophobic monomer weight ratio is in a range of from 5:95 to 40:60.

A copolymer can be obtained by copolymerizing these hydrophobic monomers and hydrophilic monomers. Polymerization can be carried out by a known method, but it is preferable that copolymerization is carried out by a random copolymerization method since a copolymer obtained by random copolymerization provides an excellent stability as a lapse of time when a dispersion is prepared by using the copolymer thus obtained as a dispersant.

It is particularly preferable to use an alkali-soluble resin obtained by neutralizing the above-mentioned copolymer of a hydrophobic monomer and a hydrophilic monomer with an alkaline material as a neutralizer to have the polymer solubilized in an aqueous medium.

Examples of the neutralizer include an alkali metal hydroxide such as sodium hydroxide, potassium hydroxide or the like, monoethanolamine, diethanolamine, triethanolamine, monoethylamine, diethylamine, triethylamine, morpholine, ammonia, and the like.

Preferable examples of the water-soluble resin having a hydrophilic group and a hydrophobic group include a styrene-acrylic acid copolymer, a styrene-methylstyrene-acrylic acid copolymer, a styrene-acrylic acid-(meth)acrylic acid ester (a lower alkyl ester of about $C_1$-$C_4$, hereinafter the same) copolymer, a methacrylic acid-(meth)acrylic acid ester copolymer, an acrylic acid-(meth)acrylic acid ester copolymer, a styrene-methacrylic acid copolymer, a styrene-maleic acid copolymer, a styrene-methylstyrene-maleic acid copolymer, a styrene-(meth)acrylic acid ester-maleic acid copolymer, a styrene-(meth)acrylic acid ester-allylsulfonic acid copolymer, a vinylnaphthalene-acrylic acid copolymer, a vinylnaphthalene-maleic acid copolymer, or their sodium, potassium or ammonium salts, and the like. They may be used respectively alone or in a mixture of two or more.

Among them, particularly preferable examples include a styrene-acrylic acid copolymer, a styrene-methylstyrene-acrylic acid copolymer, a styrene-maleic acid copolymer, a methacrylic acid-(meth)acrylic acid ester copolymer, and the like. When they are used, a pigment dispersion having particularly excellent dispersibility can be obtained.

Other various water-soluble resins known as a high molecular dispersant can also be used. For example, a polyvinyl alcohol type dispersant, a polyacrylamide type dispersant, a polyester type dispersant, a polyacrylic acid type dispersant or the like is known, and they may be selected from commercially available products.

A glass transition point of the water-soluble resin is not specially limited, but a preferable glass transition point is at least 30° C., more preferably at least 50° C. When the glass transition point is less than 30° C., a dispersion and an ink composition become poor in stability as a lapse of time. When the glass transition point is less than 30° C., a pigment having a function partially as a dispersant does not work when a temperature is raised, and consequently the stability as a lapse of time becomes poor.

The glass transition point indicates a temperature zone wherein physical properties rapidly vary by partial crystallization or hydrogen bonding in the inside of a non-crystalline solid such as a plastic when a temperature is lowered, and can be measured by a thermally analyzing apparatus such as "DSC7" of Perkin Elmer Co. It is general to carry out the thermal analysis at a temperature gradient of 5 to 10° C./min.

Particularly, a copolymer comprising a hydrophobic monomer such as styrene or (meth)acrylic acid ester and a hydrophilic monomer such as (meth)acrylic acid, and having a glass transition point of at least 30° C., more preferably at least 50° C., is particularly excellent in dispersion stability.

A molecular weight of a water-soluble resin is not specially limited, but a preferable molecular weight is 2,000 to 30,000, more preferably 2,000 to 20,000, as a weight average molecular weight measured by GPC (gel permeation chromatography).

Also, an acid value of a water-soluble resin is preferably from 50 to 320, more preferably from 55 to 270. The acid value is an mg amount of KOH necessary for neutralizing 1 g of a resin.

A water-soluble resin is added in an amount of from 5 to 100 parts by weight, more preferably from 10 to 80 parts by weight, to 100 parts by weight of a pigment. If the amount of a water-soluble resin is less than 5 parts by weight to 100 parts by weight of a pigment, dispersibility of a pigment becomes insufficient and a deposit is formed or a stability as a lapse of time becomes poor. On the other hand, if the amount of a water-soluble resin exceeds 100 parts by weight, a dispersion or an ink prepared therefrom becomes highly viscous, and an injecting performance is lowered.

(Resin Having an Amide Bond and/or a Urethane Bond)

The present invention further employs a resin having an amide bond and/or a urethane bond as a second resin in addition to the above-mentioned water-soluble resins. Their examples include a homopolymer obtained by polymerizing (meth)acrylamide, vinylpyrrolidone or the like, a copolymer of the above illustrated homopolymers with other vinyl monomers, a polyurethane resin, and the like.

Among them, a polyurethane resin is particularly preferable. The polyurethane resin is not specially limited, and a water-soluble or water-dispersible polyurethane resin obtained by reacting a diisocyanate compound and a diol compound is usable.

Examples of the diisocyanate compound include an alicyclic diisocyanate compound such as hexamethylene diisocyanate, 2,2,4-trimethylhexamethylene diisocyanate, hydrogenated xylylene diisocyanate, 1,4-cyclohexane diisocyanate, 4,4'-dicyclohexylmethane diisocyanate or the like, an arylaliphatic diisocyanate compound such as xylylene diisocyanate, tetramethylxylylene diisocyanate or the like, an aromatic diisocyanate compound such as toluilene diisocyanate, phenylmethane diisocyanate or the like, a modified material of the above illustrated diisocyanates (such as carbodiimide, uretodion or uretoimine-containing modified materials), and the like.

Examples of the diol compound include a diol compound obtained by (co)polymerizing an alkylene oxide such as ethylene oxide or propylene oxide, and a heterocyclic ether such as tetrahydrofuran or the like. Particular examples of the diol compound include a polyether diol such as polyethylene glycol, polypropylene glycol, polytetramethylene ether glycol, polyhexamethylene ether glycol or the like, a polyester diol such as polyethylene adipate, polybutylene adipate, polyneopentyl adipate, poly-3-methylpentyl adipate, polyethylene/butylene adipate, polyneopentyl/hexyl adipate or the like, a polylactone diol such as polycaprolactone diol or the like, polycarbonate diol, and the like. Among them, at least one kind of polyether type, polyester type and polycarbonate type diol compounds is preferable.

Further, in addition to the above compounds, diol compounds having an acidic group such as a carboxylic acid group, a sulfonic acid group or the like are usable, examples of which include dimethylolacetic acid, dimethylolpropionic acid, dimethylolbutyric acid and the like. Among them, dimethylolpropionic acid is preferable.

These diol compounds may be used in a combination of two or more kinds.

In the preparation of a polyurethane type resin, a polyhydroxy compound having a low molecular weight may be added. Examples of the polyhydroxy compound having a low molecular weight includes a material usable as a starting material for polyester diol, such as glycol, an alkylene oxide low mol adduct, a trihydric alcohol such as glycerin, trimethylolethane or trimethylolpropane, and their alkylene oxide low mol adducts. Also, with regard to the urethane prepolyemr thus obtained, a chain can be extended after neutralizing or during neutralizing an acid group derived from dimethylolalkanoic acid or a chain can be extended with di(tri)amine. Examples of a polyamine used in the extension of chain include hexamethylenediamine, isophoronediamine, hydrazine, piperazine or the like, and they may be used in a combination of two or more.

The form of a urethane resin is not limited. Typical forms include an emulsion type such as self-emulsified emulsion or self-stabilized type. Particularly, among the above compounds, a diol having an acidic group such as a carboxylic acid group, a sulfonic acid group or the like is preferably usable, or a polyhydroxy compound having a low molecular weight may be added, or a urethane resin having an acidic group introduced, particularly one having a carboxyl group, is desirable. Further, it is preferable for improving gloss or friction resistance to crosslink these functional groups such as a carboxyl group with the following crosslinking treatment.

These resins further neutralized are usable, and examples of a base used for neutralization include an alkyl amine such as butyl amine or trimethyl amine, an alkanol amine such as monoethanol amine, diethanol amine or triethanol amine, morpholine, ammonia, and an inorganic base such as sodium hydroxide or the like.

Examples of a high molecular material having an amide bond and/or a urethane bond include a polyether type polyurethane resin, a polyester type polyurethane resin or a polycarbonate type polyurethane resin, which are obtained by using a polyether type diol, a polyester type diol or a polycarbonate type diol.

Also, an acid value of the high molecular compound having an amide bond and/or a urethane bond is not specially limited, but is preferably from 5 to 100, more preferably from 10 to 80. Preferable examples of the high molecular compound having an amide bond and/or a urethane bond include NeoRez R-960 (manufactured by Zeneca), NeoRez R-989 (manufactured by Zeneca), NeoRez-9320 (manufactured by Zeneca), NeoRad NR-440 (manufactured by Zeneca), Hydran AP-30 (manufactured by Dainippon Ink and Chemicals, Incorporated), Hydran APX-601 (manufactured by Dainippon Ink and Chemicals, Incorporated), Hydran SP-510 (manufactured by Dainippon Ink and Chemicals, Incorporated), Hydran SP-97 (manufactured by Dainippon Ink and Chemicals, Incorporated), Elastron MF-60 (manufactured by Daiichi Kogyo Seiyaku Co., Ltd.), Elastron MF-9 (manufactured by Daiichi Kogyo Seiyaku Co., Ltd.), M-1064 (manufactured by Daiichi Kogyo Seiyaku Co., Ltd.), Izelax S-1020 (manufactured BY Hodogaya Chemical Co., Ltd.), Izelax S-1040 (manufactured by Hodogaya Chemical Co., Ltd.), Izelax S-1085C (manufactured by Hodogaya Chemical Co., Ltd.), Izelax S-4040N (manufactured by Hodogaya Chemical Co., Ltd.), Neotan UE-5000 (manufactured by Toagosei Co., Ltd.), RU-40 series (manufactured by Stal Japan), Ucoat UWS-145 (manufactured by Sanyo Chemical Industries, Ltd.), Parmarin UA-150 (manufactured by Sanyo Chemical Industries, Ltd.), WF-41 series (manufactured by Stal Japan) and WPC-101 (manufactured by Nippon Polyuretahne Industry Co., Ltd.).

The resin having a urethane bond and/or an amide bond is added in an amount of from 5 to 100 parts by weight, preferably from 10 to 80 parts by weight, to 100 parts by weight of a pigment. If the amount of the resin is less than 5 parts by weight to 100 parts by weight of a pigment, friction resistance of a recorded material becomes poor, and stability as a lapse of time also becomes poor. On the other hand, if the amount of the resin exceeds 100 parts by weight, a dispersion and an ink composition become highly viscous, and an injecting performance becomes lowered, thereby lowering gloss.

(Resin Adsorbed to Pigment and Free Resin)

The present invention is characterized by using a combination of the above-mentioned water-soluble resin and the resin having an amide bond and/or a urethane bond. An adding method is not limited, but preferably the water-soluble resin is first added to a pigment. Thereafter, the mixture is subjected to the following kneading step to form a dispersion having the pigment dispersed therein, and then it is preferable to add the resin having an amide bond and/or a urethane bond to the dispersion. It is preferable to carry out the following crosslinking treatment before or after adding the resin having an amide bond and/or a urethane bond. Particularly, it is preferable to carry out the crosslinking treatment after adding the resin having an amide bond and/or a urethane bond. It has been found that dispersion stability and gloss are remarkably improved by adding the resins in this manner. This is probably because the water-soluble resin is firmly fixed onto the pigment surface in the kneading step to achieve a desired dispersion state, and the water-soluble resin and the resin having an amide bond and/or a urethane bond forms a film coated on the pigment surface by the crosslinking reaction, and the film is more firmly fixed and stabilized. At the same time, an amount of a free resin not adsorbed on the pigment can be reduced, and the added resin can effectively disperse the pigment, thereby achieving quite satisfactory dispersion stability. Also, by using a urethane resin having an acidic group introduced as the resin having an amide bond and/or a urethane bond, particularly one having a carboxyl group, these carboxyl groups are crosslinked with a functional group such as a carboxyl group contained in the previously added water-soluble resin by a crosslinking agent in the crosslinking step, thus more firmly bonding to the pigment. It is more preferable to carry out the crosslinking treatment after adding the resin having an amide bond and/or a urethane bond, but even before adding the resin having an amide bond and/or a urethane bond, the crosslinking treatment may be carried out after adding the water-soluble resin and the crosslinked water-soluble resin is firmly fixed on the pigment to improve stability.

For example, this is proved by measuring a ratio of a resin adsorbed on a pigment and other unadsorbed free resin by the following method. The method for measuring an amount of an unadsorbed resin comprises precipitating a pigment and a resin content adsorbed on the pigment by an ultra-centrifugal machine, and then measuring an amount of a remaining resin contained in the supernatant liquid by TOC (total organic carbon meter) or gravimetric method (method comprising evaporating the supernatant liquid to solid and measuring a resin amount) (JP-A-2-255,875).

A particularly suitable method in the present invention comprises subjecting a liquid to an ultra-high speed cooling centrifugal machine (Beckman-made) at 55,000 rpm for 5 hours to precipitate a pigment content and a resin content adsorbed on the pigment, thereafter taking a predetermined amount of the supernatant liquid or taking only a resin not adsorbed by a membrane-separating method such as an ultra-filtration method, and then drying to solid by a vacuum dryer (60° C., 24 hours). This resin amount is calculated by percentage as a remaining resin concentration to the charged ink.

Firstly, a satisfactory dispersion can be achieved by dispersing a pigment at a stage of adding a water-soluble resin, and then a resin having an amide bond and/or a urethane bond is added to carry out crosslinking treatment, thereby firmly fixing the both resins to the pigment. Further, when a solvent having a high permeability is added thereto, stability is improved and agglomeration of pigments at the time of drying is hardly caused, and smoothness of a paper surface is improved, thus improving gloss also.

A weight ratio of a water-soluble resin and a resin having a urethane bond and/or an amide bond is preferably (water-soluble resin)/(resin having a urethane bond and/or an amide bond)=1/2 to 2/1 based on respective solid contents, and particularly when printing in a weight ratio of ranging from 1/1.5 to 1.5/1, a printed image becomes excellent in gloss.

(Kneading Step)

In the present invention, it is preferable to first knead a pigment and the above-mentioned water-soluble resin. The kneading step is not specially limited and a well known step may be employed so long as the pigment and the water-soluble resin are kneaded in contact with each other. A solid content ratio (weight) of pigment: water-soluble resin is preferably 95:5-65:35, more preferably 90:10-70:30. Also, depending on the state of a pigment and a water-soluble resin, a system of being mixed with water may be employed, and in such a case, an ordinary stirrer may be satisfactorily used. If necessary, a pigment may be wetted with a water-soluble resin. Generally, a resin and a water-soluble resin, and an organic resin added optionally as desired, are charged into a kneading apparatus, and are kneaded therein.

The organic solvent used is not specially limited, but it is preferable to use a solvent having such a high boiling point as not being volatilized in the kneading step in order to prevent the pigment from splashing during the step, and it is preferable to have the resin dissolved by using a solvent having a lower boiling point in combination.

Examples of the solvent having a high boiling point include polyhydric alcohols such as ethylene glycol, propylene glycol, diethylene glycol, dipropylene glycol, polyethylene glycol or glycerin, pyrrolidones such as N-methyl-2-pyrrolidone or 2-pyrrolidone, and the like. An amount of the solvent used is selected depending on a combination of a pigment and a resin in such a manner as to apply an appropriate shear to a mixture of a pigment and a resin during the kneading operation, and the solvent is generally added in an amount of from 20 to 100 parts by weight, preferably from 30 to 80 parts by weight, to 100 parts by weight of a pigment.

Examples of the organic solvent having a low boiling point used at the time of kneading include alcohols such as methanol, ethanol or isopropyl alcohol, and ketones such as acetone or methyl ethyl ketone.

A kneading apparatus employed is not specially limited so long as it provides an appropriate shear to a mixture of a pigment and a resin in contact with each other at the time of kneading, and may be selected from general kneading apparatuses. Typical examples include two-roll or three-roll rollers or kneaders. The mixture of a pigment and a water-soluble resin in a kneading apparatus is heated by the heat of the apparatus or self-heated by a shear force received from the kneading apparatus, thereby raising a temperature. It is desirable that the resin becomes a molten state at this time, and that the pigment is pulverized by the shear force provided from the kneading apparatus and is dispersed in the resin. The kneading temperature is adjusted to be from 25 to 200° C., preferably from 100 to 150° C.

Various methods are usable as a method for preparing an ink composition or a pigment dispersion from the kneaded product of pigment obtained in the above kneading step, but it is preferable to neutralize a base of the resin with alkali.

The neutralization may be carried out by adding the pigment kneaded product to a solvent having an alkaline compound added in water, and mixing and stirring. The alkaline compound used for neutralization is not specially limited. Examples of the alkaline compound include organic amines such as ammonia, monomethanol amine, diethanol amine, triethanol amine, morpholine or 2-amino-2-methyl-1-propanol; and alkali metal salts such as sodium hydroxide, potassium hydroxide or ammonium hydroxide.

It is most idealistic that an amount of the alkaline compound added is such an amount as to completely neutralize a hydrophilic group in the resin, and accordingly it is preferable to make a neutralization rate of 80 to 150%, particularly 90 to 120%, which is determined by an equivalent amount of the alkaline compound added and an acid equivalent amount of the resin.

It is preferable to heat the materials at the time of neutralizing. The heating temperature is preferably from 40 to 100° C., more preferably from 60 to 90° C.

The pigment kneaded product is dispersed by a dispersing machine such as a beads mill as described below. At this time, various additives such as a preservative, a wetting agent and the like may be added in addition to the pigment kneaded product, water and alkali.

(Dispersing Step)

In the present invention, it is quite preferable to finely pulverize a pigment by carrying out a dispersing step after the above kneading step. Dispersing means are not specially limited, and typical examples include various mechanical methods conventionally employed in the preparation of a pigment fine particle dispersion, e.g. a mechanical method such as a grinding method using a ball mill and a pulverizing method by vibration such as an ultrasonic dispersing machine. Further, it is well known to employ a method of using a dispersing machine called as a sand mill, a basket mill or a pearl mill for an apparatus of obtaining finer particles.

It is preferable in the present invention to stir the pigment kneaded product obtained in the above kneading step with a dispersing medium and to disperse the product by a shear force of the dispersing medium. The dispersing medium and a dispersing machine used herein are not specially limited, and conventionally well known various materials may be used. As a wet type pulverizing apparatus carrying out dispersion by pass-system or multi-system, it is particularly preferable to employ an apparatus having an ability of separating a dispersing medium as fine beads having a diameter of at most 0.5 mm.

The dispersing medium is not specially limited, but its preferable examples include ceramics; hard glass such as soda glass beads or alkali-free beads; hard plastic beads such as polymethyl methacrylate beads; metals such as chrome beads or stainless steel beads; or metal compounds such as zirconia. Zirconia is particularly preferable since it can produce satisfactorily fine particles.

In order to sufficiently disperse a pigment and to make finer particles, an amount of a dispersing medium loaded into a dispersing machine is at least 65%, preferably at least 70%, and a mixing ratio of a dispersing medium and an aqueous pigment composition (dispersing medium/aqueous pigment composition (volume ratio)) is at least 1/30, preferably at least 1/25, and when considering a practical operation efficiency, the mixing ratio is preferably at most 1/1, more preferably at most 1/2.

Further, it is preferable to operate a wet system pulverizing apparatus having the above-mentioned dispersing machine at a peripheral velocity of at least 5 m/s, preferably at least 7 m/s, in respect of making fine particles of a pigment.

Further, the time of operating the wet system pulverizing apparatus is not specially limited, but may be from about 2 to 150 minutes as a residence time of dispersion.

(Dispersion State)

It is preferable that a particle size is at least 5 nm and at most 200 nm after dispersing a pigment. Further, it is preferable to finally make a pigment having a particle size in a range of from 5 to 100 nm by removing coarse particles by centrifugal treatment. If the particle size exceeds 100 nm, separation or settling of pigments tends to occur. On the other hand, if the particle size is smaller than 5 nm, control or light resistance performances of particles become poor. A particularly preferable particle size is in a range of from 5 to 80 nm.

This particle size is a dispersed particle size (volume 50% particle size) of pigment particles actually forming a dispersion, and Microtrac UPA (LEEDS & NORTHRUP Co.) is used as a measuring device.

(Crosslinking Treatment)

After dispersing a pigment, it is preferable to crosslink a resin adsorbed on the pigment with a crosslinking agent. A pigment is finely pulverized in a kneading step and a dispersing step, and it is preferable to crosslink a resin in a dispersion state before or after adding a resin having a urethane bond and/or an amide bond. A crosslinking agent crosslinkable at a low temperature of about 0 to 100° C. is preferable as a crosslinking agent, and a crosslinking agent of completely water-soluble type or organic solvent-containing water-soluble type polymer or oligomer is preferable in respect of providing a uniform reaction in an aqueous dispersion, but is not limited thereto. This crosslinking reaction is a reaction of producing a new chemical bond bonding high molecular materials having a chain-like structure to newly develop a tridimensional net-like structure, and includes a case of further crosslinking high molecular materials already having a partially crosslinked structure and also a case of precipitating a higher molecular material from a dissolved resin. A curing reaction is also included in the crosslinking reaction.

Examples of the crosslinking agent include a carboxyl group-reactive type such as a polycarbodiimide type having a carbodiimide group in a molecule, an oxazoline type having an oxazoline group in a molecule or an aziridine type. Further examples include a hydroxyl group-reactive type such as a melamine resin type of butyrated melamine or full-etherified melamine, or an isocyanate type represented as an aqueous block isocyanate. Still further examples include a carbonyl group-reactive type such as a dihydrazide type.

In addition to these examples, there are illustrated an ethyleneimine type having an active amino group such as polyethyleneimine, aminoethyl-modified ethyleneimine or aziridinyl-modified ethyleneimine, an aliphatic amine such as polymethylene diamine, an aromatic amine such as diaminodiphenylmethane, an epoxy resin type having a glycidyl ether structure, and an aqueous oligomer such as an acryl oligomer having a (meth)acryloyl group.

Examples of the aqueous oligomer include an oligoester (meth)acrylate mainly having an ester bond, an epoxy (meth) acrylate having an epoxy resin as a main structure, and the like.

They are used respective alone or in a mixture of two or more.

Among them, a carboxyl group-reactive type is particularly preferable since it is excellent in dispersibility in a pigment dispersion.

A blending ratio of a crosslinking agent to a resin is preferably 1/100-50/100 at a weight ratio (crosslinking agent/ resin (effective solid content weight ratio)). If the weight ratio is smaller than 1/100, a crosslinking effect becomes poor and stability of a dispersion or an ink becomes poor, and if the weight ratio is larger than 50/100, agglomeration of pigments tends to occur and a viscosity of the liquid becomes high.

In order to make the crosslinking reaction fully proceed, the weight ratio should be at least 1/100, preferably at least 2/100, and in order to prevent qualities of an aqueous pigment dispersion from lowering is due to an excess amount of a crosslinking agent, the weight ratio is at most 50/100, preferably at most 45/100, and any further improvement of the crosslinking effect can not be expected if the weight ratio is still larger.

Also, it is possible to cause crosslinking without a crosslinking agent. In such a case, a combination of at least two kinds of crosslinkable functional groups must be contained in a molecule.

Examples of a self-crosslinkable functional group include a radical-polymerizable unsaturated functional group and a hydrolyzable alkoxysilane group.

Examples of a combination of such radical-polyemerizable unsaturated functional groups include preferably a combination of a carboxyl group and an epoxy group, a combination of a carboxyl group and a 1,3-dioxolan-2-on-4-yl group, a combination of a hydroxyl group and a blocked isocyanate group, a combination of a hydroxyl group and a N-alkoxymethylamide group, a combination of a hydroxyl group and a hydrolyzable alkoxysilane group or a combination of an amino group and an epoxy group, and a self-crosslinkable functional group may be introduced when copolymerizing the above-mentioned hydrophobic monomer and hydrophilic monomer.

Temperature and time for crosslinking a resin are not specially limited, and may be adjusted depending on kinds of a resin and a crosslinking agent employed.

pH at the time of finishing the crosslinking reaction may be in a range of from 7.0 to 10.0, and if pH is at most 7.0, there is a possibility that a water-soluble resin dissolved by naturalization tends to precipitate, and stability as a lapse of time becomes poor.

Depending on a crosslinking reaction, there are a case of initiating a curing reaction of a functional group at the same time as splashing water, a solvent and an organic amine under heating condition and a case of causing polymerization-curing by an organic amine working as a radical-generating source. In any case, tridimensional crosslinking proceeds to form a film firmly bonded to a pigment, thereby improving dispersion stability, and by producing a higher molecular material, gloss is improved.

The crosslinking treatment achieves remarkable effects of not causing agglomeration and adsorption among pigment particles in water, maintaining a function of a resin itself as a dispersant, curing and stabilizing. Accordingly, it is preferable to maintain a functional group, e.g. a polar group such as a carboxyl group, necessary for maintaining a resin itself in a dissolved state without completely reacting the functional group in a resin, even after crosslinking By carrying out such a crosslinking step of resin after dispersing a pigment with the resin, a dispersing effect becomes higher and an aqueous pigment dispersion having a small particle size excellent in stability as a lapse of time can be obtained, as compared with a case of dispersing a pigment with a previously crosslinked resin.

As a method for fixing a resin to the surroundings of a pigment, there is known a method of employing a precipitation reaction with a poor solvent, but the present method of combining a dispersing step and a crosslinking step has a merit of easily producing fine particles.

(Gel Fraction)

A crosslinking rate of a resin in a dispersion, i.e. so-called a gel fraction, is preferably from 20 to 100%. In order to achieve such physical properties as alkali resistance and solvent resistance, the gel fraction is preferably at least 30%, more preferably at least 35%. The upper limit of the gel fraction is 100%, and a higher gel fraction is more preferable.

The gel fraction is generally considered as a measure of a crosslinking degree of a resin, but the gel fraction in the present invention is calculated from a numerical value determined by measuring an elution amount of a resin by drying an aqueous pigment dispersion to powder and using tetrahydrofuran as a solvent.

For example, an aqueous pigment dispersion is freeze-dried and 10 g of the obtained powder is placed in 100 ml of tetrahydrofuran and is stirred at 60° C. for 1 hour. A gel fraction is calculated by measuring a solid content of a resin amount eluted in tetrahydrofuran and making an elution amount at the time of not crosslinking as "blank".

Gel fraction=(blank elution amount−elution amount after crosslinking treatment)/blank elution amount Also, a weight average molecular weight of a crosslinked resin is preferably at least 30,000, more preferably at least 200,000, in respect of fully improving properties of an aimed aqueous pigment dispersion. A larger weight average molecular weight is more preferable.

Thus, by crosslinking a resin, a dispersion containing a pigment and a crosslinked resin is obtained.

It is preferable to improve stability as a lapse of time by adjusting pH of the dispersion containing a crosslinked resin to the alkali side. It is preferable to adjust to pH of at least 8, more preferably pH of 8.5-10.

(With Regard to Ion Exchange)

It is preferable to adjust a divalent metal ion content in an aqueous pigment dispersion to at most 100 ppm by treating with an ion exchange resin or the like. It is more preferable to adjust to 50 ppm.

It is possible to use a weak acidic cation exchange resin, a strong acidic cation exchange resin or the like as a cation exchange resin. A well known ion exchange resin is usable, and it is possible to use a commercially available ion exchange resin.

Contact of a dispersion and an ion exchange resin is effected by a method of passing a dispersion through an ion exchange-treating tower or column apparatus, or a method of simply mechanically mixing and stirring a dispersion and an ion exchange resin, or other optional methods. A metal ion content can be measured by an atomic absorption photometer Z-8230 (Hitachi, Ltd.) or an ICP analyzing apparatus SPQ9000 (Seiko Denshi Corporation), and the numerical values in the present invention were measured by these apparatuses.

By reducing a multi-valent metal ion content considered to cause agglomeration, stability of a recording ink as a lapse of time can be achieved, and by preventing agglomeration of an organic pigment, a viscosity increase of a recording ink can be controlled, thereby improving an injecting property of recording ink. A multi-valent ion content in a recording ink is preferably at most 100 ppm, more preferably at most 80 ppm.

One of methods of removing multi-valent metal ions is to treat a dispersion or a recording ink with a cation exchange resin. The cation exchange resin (weak acidic cation exchange resin, strong acidic cation exchange resin) used is not specially limited so long as it removes a multi-valent metal ion, and a commercially available cation exchange resin may be appropriately selected. Examples of the commercially available cation exchange resin include [DIAION WK 10], [DIAION WK 11], [DIAION WK 20], [DIAION PA 406], [DIAION PA 408], [DIAION PA 412], [DIAION PA 416], [DIAION PA 418], [DIAION PK 208], [DIAION PK 212], [DIAION PK 216], [DIAION PK 220] and [DIAION PK 228] (manufactured by Mitsubishi Chemical Corporation), [Amberlite IR-118H], [Amberlite IR-120B], [Amberlite IR-122], [Amberlite IR-124], [Amberlite 252], [Amberlite 201CT], [Amberlite 200C], [Amberlite IRC-50] and [Amberlite IRC-84] (manufactured by Organo Corporation).

If necessary, the treatment may be carried out in combination with an anion exchange resin (weak basic anion exchange resin, medium basic anion exchange resin or strong basic anion exchange resin) treatment. Examples of the anion exchange resin include [DIAION WA 10], [DIAION WA 11], [DIAION WA 20], [DIAION WA 21], [DIAION WA 30], [DIAION PA 406], [DIAION PA 408], [DIAION PA 412], [DIAION PA 416], [DIAION PA 418], [DIAION PA 306], [DIAION PA 308], [DIAION PA 312], [DIAION PA 316], [DIAION PA 318], [DIAION SA 10A], [DIAION SA 11A], [DIAION SA 12A], [DIAION SA 20A] and [DIAION SA 21A] (manufactured by Mitsubishi Chemical Corporation), [Amberlite IRA-400T], [Amberlite IRA-430], [Amberlite IRA-458], [Amberlite IRA-458], [Amberlite IRA-900], [Amberlite IRA-904], [Amberlite IRA-938], [Amberlite IRA-958], [Amberlite IRA-410], [Amberlite IRA-411], [Amberlite IRA-910], [Amberlite IRA-68], [Amberlite IRA-35] and [Amberlite IRA-93] (manufactured by Organo Corporation).

(With Regard to Ultrafiltration)

As a method for removing impurities, an ultrafiltration membrane is used. Generally, this means a treatment with a separating membrane capable of removing each component from compounds having respectively from a low molecular weight to a high molecular weight and ionic materials in a solution by each kind of membranes.

Examples of impurities include a material remaining at the time of preparing a pigment, an excess component in a dispersion liquid composition, a dispersant not adsorbed on an organic pigment, and a contaminating component.

A molecular weight of a material separatable by an ultrafiltration membrane varies depending on its fractional molecular weight of the ultrafiltration membrane. For example, when a fractional molecular weight of the ultrafiltration membrane used in the treatment is 1000, only a material having a molecular weight of at most 1000 is separatable from a solvent.

(Pigment Dispersion Liquid)

The pigment dispersion liquid of the present invention contains a dispersion medium in addition to the above-described pigment and specific resins. The dispersion medium is not specially limited, and a dispersion medium conventionally used for a pigment dispersion liquid can be selected. For example, water and other aqueous medium are preferable, but other various organic solvents may be contained. The aqueous medium used herein means water or a water-soluble solvent compatible with water. It is particularly preferable to use an ion-exchanged water as water, but it is not limited thereto. A water-soluble solvent is preferably selected from solvents used in an ink composition described below.

Other components in the pigment dispersion liquid are not specially limited and optimally selected so long as they do not adversely affect physical properties of the dispersion or do not adversely affect the preparation of an ink, and may include a solvent selected from an organic solvent used in an ink composition for ink jet described below or an additive such as a mildew-proofing agent to an aqueous ink composition using an aqueous medium.

(Ink Composition for Ink Jet)

The ink composition of the present invention is an ink composition for ink jet having a pigment dispersed, and is an ink composition for ink jet characterized by containing a water-soluble resin and a resin having a urethane bond and/or an amide bond.

The preparation method of the ink composition of the present invention is not specially limited, but it is preferable to prepare a pigment dispersion liquid by the above-mentioned method and to remove coarse particles contained therein by centrifugal treatment, and thereafter it is preferable to proceed with an ink-producing step by adding an organic solvent such as a water-soluble organic solvent.

A content of a pigment in the ink composition is preferably at least 0.5 wt %, more preferably at least 2 wt %, in order to satisfactorily achieve a coloring effect, and is preferably at most 25 wt %, more preferably at most 10 wt %, in order to provide an appropriate viscosity for maintaining a satisfactory injecting performance at the viscosity of the ink composition.

Examples of a preferable water-soluble organic solvent include ethylene glycol, diethylene glycol, triethylene glycol, polyethylene glycol, propylene glycol, butylene glycol, 1,2,6-hexanetriol, thioglycol, hexylene glycol, glycerin, diglycerin, 2-pyrrolidone, N-methyl-2-pyrrolidone, 1,5-pentanediol, 1,3-dimethyl-2-imidazolidinone and the like, and they may be used respective alone or in a mixture of two or more.

The water-soluble organic solvent is added in an amount of from 5 to 30 wt %, preferably from 6 to 25 wt %, to an ink liquid, and if the water-soluble organic solvent is added in an amount of higher than the above upper limit, the ink itself becomes highly viscous, and consequently stability and injecting performance of the ink become poor, a blur into a paper becomes large, and a drying speed becomes low. Particularly, it is preferable that the viscosity is at most 20 mPa·s.

In addition to the above solvents, other water-soluble organic solvents may be used, examples of which include methanol, ethanol, n-propanol, iso-propanol, n-butanol, iso-butanol, t-butanol, trimethylolpropane, ethylene glycol monoethyl ether, ethylene glycol monobutyl ether, and the like.

Further, the ink composition of the present invention may contain such additives as a mildew-proofing agent, a defoaming agent, a rust-proofing agent, an antiseptic agent and the like.

As described above, the ink composition of the present invention is excellent particularly as an ink for ink jet. For example, the ink composition is applicable to an ink jet recording method characterized in that printing is carried out by injecting the ink composition through a nozzle of an ink jet printer or an ink jet recording method characterized in that recording is carried out by liquid droplets formed by applying heat energy to the ink composition. Further, the ink composition of the present invention is applicable to an ink jet recording method characterized in that recording is carried out by liquid droplets formed by applying a mechanical energy to the ink composition.

(With Regard to Preparation of High Permeability)

The ink composition of the present invention is particularly suitable for being used as an ink jet ink having a high permeability. For example, conventionally known various methods can be employed for raising a high permeability. For instance, JP-A-2001-302,950 illustrates an ink composition having an improved permeability to a recording medium and having an excellent continuous injecting stability by containing a surfactant having an acetylene bond. Also, it is possible to add a propylene oxide adduct of a lower alcohol.

Further, JP-A-2002-3760 illustrates one containing a compound of the following chemical formula (1) having an acetylene bond, 1,5-pentanediol, and a butyl ether type solvent.

Formula (1):

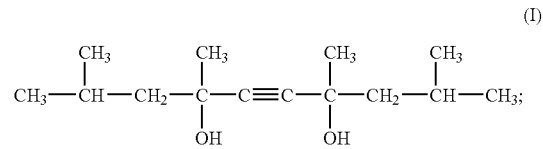

(I)

Further, JP-A-2002-30,237 illustrates an ink composition containing an acetylene glycol type surfactant and/or a polysiloxane type surfactant, an alkylether derivative of a polyhydric alcohol, the alkyl carbon number of which is at least 3 (preferably from 3 to 6), as an organic solvent, and/or 1,2-alkanediol, as a satisfactory ink composition having an excellent color reproducibility, a high permeability and a short drying time.

As described in JP-A-2002-30,237, examples of an organic solvent include ethylene glycol monobutyl ether, diethylene glycol mono-n-propyl ether, ethylene glycol monoethyl ether, ethylene glycol mono-iso-propyl ether, diethylene glycol mono-iso-propyl ether, ethylene glycol mono-n-propyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, and the like.

As described in JP-A-2002-30,237, examples of a 1,2-alkanediol include preferably 1,2-$C_1$-$C_8$ alkanediol, more preferably 1,2-$C_1$-$C_6$ alkanediol, most preferably 1,2-hexanediol. The 1,2-alkanediol is added in an amount of from 1 to 15 wt %, preferably 2 to 10 wt %.

Preferable examples of an acetylene glycol type surfactant include various compounds illustrated in JP-A-2002-30237. More particular examples include Surfynol 82, 104, 440, 465, 485, TG (manufactured by Air Products and Chemicals, Inc.), Orfin STG, E1010 (manufactured by Nisshin Kagaku K.K.), and the like.

EXAMPLES

The present invention is further illustrated with reference to the following Examples. In the Examples, "part" means "part by weight", and "%" means "wt %".

Example 1

The following respective components were charged into a pressure kneader, and were kneaded at room temperature for 10 hours to prepare a pigment kneaded product.

| Component | Amount (parts) |
| --- | --- |
| Magenta pigment (Fastgen Supermagenta RTS: (Dainippon Ink and Chemicals, Incorporated)) (P.R122 (C.I. 73915) | 100.0 |
| Styrene-methylstyrene-acrylic acid copolymer (acid value 200, weight average molecular weight 7500, glass transition temperature 80° C.) | 20.0 |
| Glycerin | 67.0 |
| Isopropyl alcohol | 20.0 |

Thereafter, 42 parts of the above obtained pigment kneaded product, 3 parts of triethanolamine and 55 parts of ion-exchanged water were mixed, and were stirred under heating at 95° C. for 2 hours, and were subjected to 3 pass treatment using 0.5 mm glass beads in a sand mill to prepare a dispersion liquid.

The dispersion liquid was adjusted to pH 8.5 with sodium hydroxide, and was subjected to centrifugal treatment at 25000 G for 5 minutes to remove coarse particles. After removing the coarse particles, the dispersion liquid had a solid content of 26.0%, a pH value of 8.3 and a pigment particle size (volume 50% dispersion size) of 75.2 nm.

10.0 Parts of a polyester type polyurethane resin (acid value 20, triethylamine neutralization, solid content 35%) and 5 parts of a 30% polycarbodiimide type crosslinking agent (carbodiimide equivalent 300, completely water-soluble) were added to the dispersion liquid, and the resultant mixture was stirred at 90° C. for 5 hours to crosslink the resin in the dispersion liquid. At the time of finishing the crosslinking reaction, pH was 7.4. Gel fraction exceeded 35%. Further, solid content concentration was adjusted to 20 wt %. The dispersion liquid thus prepared is referred to as "magenta dispersion". An ink composition was prepared by using the magenta dispersion thus obtained and the following components.

| Component | Amount (parts) |
| --- | --- |
| Magenta dispersion (solid content 20%) | 15.0 |
| Diethylene glycol | 15.0 |
| Diethyleneglycol mono-n-propyl ether | 10.0 |
| Glycerin | 4.0 |
| Orfin STG | 1.0 |
| Antiseptic agent (benzisothiazoline) | 0.2 |
| Ion exchanged water | 54.8 |

The above components were stirred for 30 minutes to form an ink composition.

(Evaluation Test)

The above obtained composition was tested to evaluate stability as a lapse of time and injecting performance in accordance with the following methods, and the results are shown in the following Table 1.

(a) Test for Stability as a Lapse of Time

The ink composition was allowed to stand in a constant temperature room at 50° C. for 1 month, and presence or absence of separation of pigment, water floating and precipitation as well as changes in viscosity and average particle size of pigment were observed. It was evaluated as "abnormal" when the separation of pigment, water floating and precipitation occurred even at a small degree or the changes in viscosity and average particle size of pigment were caused.

As this result, normal state was expressed as "○", and abnormal state was expressed as "X"

(b) Test for Injecting Performance

The ink composition charged into a cartridge, and 200 paper sheets were printed at 2880×1440 dpi (4 pl) by using a printer "PM-4000PX" (manufactured by Seiko Epson Corporation). The paper sheet used was PM photographic paper<gloss> (manufactured by Seiko Epson Corporation). It was evaluated as "abnormal" when clogging of a nozzle or unsatisfactory printing was caused even at a small degree.

Normal state was expressed as "○", and abnormal state was expressed as "X".

(c) Gloss

The paper sheet printed by the above injecting performance test (b) was measured with regard to gloss on 20° mirror surface by using a gloss meter VG2000 (manufactured by Nippon Denshoku Kogyo K.K.).

(d) Friction Resistance

The above printed paper sheet was rubbed with a hand to evaluate friction resistance. The results were expressed as "○" (excellent), "Δ" (acceptable) and "X" (unacceptable), and are shown in the following Table 1.

Comparative Example 1

An ink composition was prepared in the same manner as in Example 1, except that the polyester type polyurethane resin was not added. The same evaluation tests as in Example 1 were carried out, and the results are shown in the following Table 1.

Example 2

The following respective components were charged into a pressure kneader, and were kneaded at room temperature for 8 hours to prepare a pigment kneaded product.

| | |
|---|---|
| Yellow pigment (Yellow 5G: (MIKUNI SHIKISO KABUSHIKI KAISHA)) (P.Y14 (C.I. 21095) | 100.0 |
| Styrene-methylstyrene-acrylic acid copolymer (acid value 160, weight average molecular weight 8000, glass transition temperature 75° C.) | 20.0 |
| Glycerin | 67.0 |
| Isopropyl alcohol | 20.0 |

Thereafter, 42 parts of the above obtained pigment kneaded product, 1.5 parts of KOH and 56.5 parts of ion-exchanged water were mixed, and were stirred under heating at 80° C. for 2 hours, and were subjected to 3 pass treatment using 0.5 mm glass beads in a sand mill to prepare a dispersion liquid.

The dispersion liquid was adjusted to pH 8.5 with sodium hydroxide, and was subjected to centrifugal treatment at 25000 G for 5 minutes to remove coarse particles. After removing the coarse particles, the dispersion liquid had a solid content of 26.8%, a pH value of 8.4 and a pigment particle size (volume 50% dispersion size) of 9.8 nm.

4 Parts of a polycarbonate type polyurethane resin (acid value 30, triethylamine neutralization, solid content 40%) and 2 parts of a 30% polyethyleneimine type crosslinking agent (amine hydrogen equivalent 650, completely water-soluble) were added to the dispersion liquid, and the resultant mixture was stirred at 90° C. for 3.5 hours to crosslink the resin in the dispersion liquid.

At the time of finishing the crosslinking reaction, pH was 7.8. Gel fraction exceeded 35%. Further, solid content concentration was adjusted to 20 wt %. The dispersion liquid thus prepared is referred to as "yellow dispersion". An ink composition was prepared by using the yellow dispersion thus obtained and the following components.

| Component | Amount (parts) |
|---|---|
| Yellow dispersion (solid content 20%) | 15.0 |
| Diethylene glycol | 10.0 |
| Ethylene glycol monobutyl ether | 10.0 |
| Glycerin | 7.0 |
| Surfynol 485 | 0.5 |
| Antiseptic agent (benzisothiazoline) | 0.2 |
| Ion exchanged water | 57.3 |

The above components were stirred for 30 minutes to form an ink composition. The evaluation test was carried out in the same manner as in Example 1, and the results are shown in the following Table 1.

Example 3

The following respective components were charged into a pressure kneader, and were kneaded at room temperature for 8 hours to prepare a pigment kneaded product.

| | |
|---|---|
| Blue pigment (Fastgen Blue TGR: (Dainippon Ink and Chemicals, Incorporated)) (Pigment•Blue 15:3 (C.I. 74160) | 100.0 |
| Styrene-acrylic acid copolymer (acid value 75, weight average molecular weight 12000, glass transition temperature 70° C.) | 20.0 |
| Glycerin | 67.0 |
| Isopropyl alcohol | 20.0 |

Thereafter, 42 parts of the above obtained pigment kneaded product, 3.5 parts of triethanolamine and 54.5 parts of ion-exchanged water were mixed, and were stirred under heating at 80° C. for 2 hours, and were subjected to 3 pass treatment using 0.5 mm glass beads in a sand mill to prepare a dispersion liquid.

The dispersion liquid was adjusted to pH 8.5 with sodium hydroxide, and was subjected to centrifugal treatment at 25000 G for 5 minutes to remove coarse particles. After removing the coarse particles, the dispersion liquid had a solid content of 25.9%, a pH value of 8.3 and a pigment particle size (volume 50% dispersion size) of 56.3 nm.

Parts of a polyether type polyurethane resin (acid value 50, triethylamine neutralization, solid content 25%) and 8 parts of a 20% epoxy resin (epoxy equivalent 200) were added to the dispersion liquid, and the resultant mixture was stirred at 90° C. for 5 hours to crosslink the dispersed resin in the dispersion liquid.

At the time of finishing the crosslinking reaction, pH was 7.8. Gel fraction exceeded 35%.

Further, solid content concentration was adjusted to 20 wt %. The dispersion liquid thus prepared is referred to as "blue dispersion". An ink composition was prepared by using the blue dispersion thus obtained and the following components.

| Component | Amount (parts) |
|---|---|
| Blue dispersion (solid content 20%) | 15.0 |
| Ethylene glycol monoethyl ether | 10.0 |
| 2-Pyrrolidone | 5.0 |
| 1,2-Hexanediol | 10.0 |
| Surfynol 465 | 0.5 |
| Antiseptic agent (benzisothiazoline) | 0.2 |
| Ion exchanged water | 59.3 |

The above components were stirred for 30 minutes to form an ink composition. The evaluation test was carried out in the same manner as in Example 1, and the results are shown in the following Table 1.

Example 4

The following respective components were charged into a pressure kneader, and were kneaded at room temperature for 12 hours to prepare a pigment kneaded product.

| | |
|---|---|
| Green pigment (Fastgen Green S: (Dainippon Ink and Chemicals, Incorporated)) (Pigment•Green 7 (C.I. 74260) | 100.0 |
| Ethyl methacrylate-methacrylic acid copolymer (acid value 120, weight average molecular weight 15000, glass transition temperature 65° C.) | 20.0 |
| Glycerin | 67.0 |
| Isopropyl alcohol | 20.0 |

Thereafter, 42 parts of the above obtained pigment kneaded product, 2.5 parts of triethanolamine and 55.5 parts of ion-exchanged water were mixed, and were stirred under heating at 80° C. for 2 hours, and were subjected to 3 pass treatment using 0.5 mm glass beads in a sand mill to prepare a dispersion liquid.

The dispersion liquid was adjusted to pH 8.5 with sodium hydroxide, and was subjected to centrifugal treatment at 25000 G for 5 minutes to remove coarse particles. After removing the coarse particles, the dispersion liquid had a solid content of 25.5%, a pH value of 8.4 and a pigment particle size (volume 50% dispersion size) of 81.1 nm.

4 Parts of a polycarbonate type polyurethane resin (acid value 30, triethylamine neutralization, solid content 40%) and 2 parts of a 30% polyethyleneimine type crosslinking agent (amine hydrogen equivalent 650, completely water-soluble) were added to the dispersion liquid, and the resultant mixture was stirred at 90° C. for 2.5 hours to crosslink the resin in the dispersion liquid.

At the time of finishing the crosslinking reaction, pH was 7.6. Gel fraction exceeded 35%. Further, solid content concentration was adjusted to 20 wt %. The dispersion liquid thus prepared is referred to as "green dispersion". An ink composition was prepared by using the green dispersion thus obtained and the following components.

| Component | Amount (parts) |
| --- | --- |
| Green dispersion (solid content 20%) | 15.0 |
| Propylene glycol mono-n-butyl ether | 15.0 |
| 2-Pyrrolidone | 10.0 |
| Isopropanol | 3.0 |
| Orfin STG | 0.5 |
| Antiseptic agent (benzisothiazoline) | 0.2 |
| Ion exchanged water | 56.3 |

The above components were stirred for 30 minutes to form an ink composition.

Comparative Example 2

The following respective components were charged into a pressure kneader, and were kneaded at room temperature for 8 hours to prepare a pigment kneaded product.

An ink composition was prepared in the same manner as in Example 4, except that the polycarbonate type polyurethane resin was not added. The same evaluation tests as in Example 1 were carried out, and the results are shown in the following Table 1.

Example 5

| | |
| --- | --- |
| Red pigment (Scarlet F2B: (MIKUNI SHIKISO KABUSHIKI KAISHA)) (Pigment•Red 22 (C.I. 12315) | 100.0 |
| Styrene-maleic acid copolymer (acid value 180, weight average molecular weight 3000, glass transition temperature 65° C.) | 20.0 |
| Glycerin | 67.0 |
| Isopropyl alcohol | 20.0 |

Thereafter, 42 parts of the above obtained pigment kneaded product, 3.0 parts of triethanolamine and 55.0 parts of ion-exchanged water were mixed, and were stirred under heating at 85° C. for 2 hours, and were subjected to 3 pass treatment using 0.5 mm glass beads in a sand mill to prepare a dispersion liquid.

The dispersion liquid was adjusted to pH 8.5 with sodium hydroxide, and was subjected to centrifugal treatment at 25000 G for 5 minutes to remove coarse particles. After removing the coarse particles, the dispersion liquid had a solid content of 26.0%, a pH value of 8.4 and a pigment particle size (volume 50% dispersion size) of 64.8 nm.

5 Parts of a polyether type polyurethane resin (acid value 50, triethylamine neutralization, solid content 40%) and 1 part of a 35% oxazoline type crosslinking agent (oxazoline equivalent 200) were added to the dispersion liquid, and the resultant mixture was stirred at 80° C. for 2.5 hours to crosslink the resin in the dispersion liquid.

At the time of finishing the crosslinking reaction, pH was 7.5. Gel fraction exceeded 35%. Further, solid content concentration was adjusted to 20 wt %. The dispersion liquid thus prepared is referred to as "red dispersion". An ink composition was prepared by using the red dispersion thus obtained and the following components.

| Component | Amount (parts) |
| --- | --- |
| Red dispersion (solid content 20%) | 15.0 |
| Ethylene glycol | 15.0 |
| Triethylene glycol monobutyl ether | 10.0 |
| Isopropanol | 1.0 |
| Surfynol 485 | 0.7 |
| Antiseptic agent (benzisothiazoline) | 0.2 |
| Ion exchanged water | 58.1 |

The above components were stirred for 30 minutes to form an ink composition.

Example 6

An ink composition was prepared in the same manner as in Example 2, except that the polycarbodiimide type crosslinking agent was not added. The same evaluation tests as in Example 1 were carried out, and the results are shown in the following Table 1.

Example 7

An ink composition was prepared in the same manner as in Example 3, except that the kneading step was not carried out. The same evaluation tests as in Example 1 were carried out, and the results are shown in the following Table 1.

Example 8

An ink composition was prepared in the same manner as in Example 5, except that the centrifugal treatment of removing coarse particles was not carried out. The same evaluation tests as in Example 1 were carried out, and the results are shown in the following Table 1.

TABLE 1

| | Stability as a lapse of time | Injecting performance | Gloss value | Friction resistance |
| --- | --- | --- | --- | --- |
| Example 1 | ○ | ○ | 61.1 | ○ |
| Example 2 | ○ | ○ | 78.5 | ○ |
| Example 3 | ○ | ○ | 58.6 | ○ |
| Example 4 | ○ | ○ | 54.3 | ○ |
| Example 5 | ○ | ○ | 63.9 | ○ |
| Example 6 | X | ○ | 77.9 | Δ |
| Example 7 | ○ | ○ | 41.2 | Δ |
| Example 8 | ○ | X | 36.8 | Δ |
| Comp. Ex. 1 | X | ○ | 49.6 | X |
| Comp. Ex. 2 | X | ○ | 47.3 | X |

As evident from the above results, such a pigment dispersion for ink jet having a pigment dispersed as an aqueous pigment dispersion, characterized by containing a water-soluble resin and a resin having a urethane bond and/or an amide bond, and an ink composition using the same, are greatly improved in stability in a highly permeable solvent, and have excellent friction resistance and gloss.

INDUSTRIAL APPLICABILITY

The present invention can provide a pigment dispersion for ink jet and an ink composition for ink jet, which are greatly improved in stability in a highly permeable solvent and have excellent friction resistance and gloss.

The invention claimed is:

1. A pigment dispersion for ink jet, comprising:
a pigment dispersed with a cross-linked water-soluble resin and a resin having a urethane bond, which is obtained by
blending the water-soluble resin with the pigment,
pulverizing the pigment in a kneading step and a dispersing step,
adding a crosslinking agent; and
adding the resin having a urethane bond,
wherein the pigment dispersion provides a gloss value at a 20° mirror surface of from 54.3 to 78.5.

2. The pigment dispersion according to claim 1, wherein the resin having a urethane bond also has an amide bond.

3. The pigment dispersion according to claim 1, wherein the water-soluble resin has a crosslinking rate of from 20 to 100%.

4. The pigment dispersion according to claim 1, which is a dispersion for ink jet.

5. An ink composition for ink jet, which is obtained by adding an organic solvent to the pigment dispersion as defined in claim 1.

6. The ink composition for ink jet according to claim 5, wherein the water-soluble resin has a crosslinking rate of from 20 to 100%.

7. An ink jet recording method, which comprises printing by discharging the ink composition for ink jet as defined in claim 5 from a nozzle of an ink jet printer.

8. An ink jet recording method, which comprises printing by discharging the ink composition for ink jet as defined in claim 6 from a nozzle of an ink jet printer.

9. An ink set having the ink composition for ink jet as defined in claim 5 charged into a cartridge.

10. An ink set having the ink composition for ink jet as defined in claim 6 charged into a cartridge.

11. An ink jet recording method, which comprises printing by discharging the ink composition for ink jet as defined in claim 5 from a nozzle of an ink jet printer.

12. An ink jet recording method, which comprises printing by discharging the ink composition for ink jet as defined in claim 6 from a nozzle of an ink jet printer.

13. The pigment dispersion according to claim 1, comprising the water-soluble resin and a resin having a urethane bond that is different from the cross-linked water-soluble resin.

14. The pigment dispersion according to claim 1, wherein the pigment has a particle size of from 5 to 100 nm.

15. The ink composition according to claim 5, wherein the pigment has a particle size of from 5 to 100 nm.

16. The ink composition according to claim 6, wherein the pigment has a particle size of from 5 to 100 nm.

17. A pigment dispersion for ink jet, comprising:
a pigment dispersed with a cross-linked water-soluble resin and a resin having an amide bond that is different from the cross-linked water-soluble resin;
wherein the pigment dispersion is obtained by
blending the water-soluble resin with the pigment,
pulverizing the pigment in a kneading step and a dispersing step,
adding a crosslinking agent; and
adding the resin having an amide bond,
wherein the pigment dispersion provides a gloss value at a 20° mirror surface of from 54.3 to 78.5.

18. The pigment dispersion according to claim 17, wherein the water-soluble resin has a crosslinking rate of from 20 to 100%.

19. An ink composition for ink jet, which is obtained by adding an organic solvent to the pigment dispersion as defined in claim 17.

20. The ink composition for ink jet according to claim 19, wherein the water-soluble resin has a crosslinking rate of from 20 to 100%.

21. An ink jet recording method, which comprises printing by discharging the ink composition for ink jet as defined in claim 19 from a nozzle of an ink jet printer.

22. An ink set having the ink composition for ink jet as defined in claim 19 charged into a cartridge.

23. An ink jet recording method, which comprises printing by discharging the ink composition for ink jet as defined in claim 19 from a nozzle of an ink jet printer.

24. An ink jet recording method, which comprises printing by discharging the ink composition for ink jet as defined in claim 20 from a nozzle of an ink jet printer.

25. An ink set having the ink composition for ink jet as defined in claim 20 charged into a cartridge.

26. The pigment dispersion according to claim 17, wherein the pigment has a particle size of from 5 to 100 nm.

27. The ink composition according to claim 19, wherein the pigment has a particle size of from 5 to 100 nm.

* * * * *